United States Patent
Hayashi et al.

(10) Patent No.: US 7,946,770 B2
(45) Date of Patent: May 24, 2011

(54) HYDRODYNAMIC BEARING DEVICE

(75) Inventors: Tatsuya Hayashi, Kuwana (JP); Kiyotaka Kusunoki, Kuwana (JP)

(73) Assignees: NTN Corporation, Osaka-Fu (JP); Nidec Corporation, Kyoto (JP)

( * ) Notice: Subject to any disclaimer, the term of this patent is extended or adjusted under 35 U.S.C. 154(b) by 1336 days.

(21) Appl. No.: 10/531,519

(22) PCT Filed: Oct. 9, 2003

(86) PCT No.: PCT/JP03/12944
§ 371 (c)(1),
(2), (4) Date: Oct. 28, 2005

(87) PCT Pub. No.: WO2004/038240
PCT Pub. Date: May 6, 2004

(65) Prior Publication Data
US 2006/0098907 A1    May 11, 2006

(30) Foreign Application Priority Data
Oct. 24, 2002  (JP) .................................. 2002-310003

(51) Int. Cl.
*F16C 17/04* (2006.01)
*F16C 33/14* (2006.01)
(52) U.S. Cl. ........................................ 384/123; 384/112
(58) Field of Classification Search .................. 384/107, 384/112, 121, 123
See application file for complete search history.

(56) References Cited

U.S. PATENT DOCUMENTS

| 6,435,721 B1 * | 8/2002 | Inoue et al. | 384/123 |
| 2002/0025089 A1 | 2/2002 | Mori et al. | 384/100 |

FOREIGN PATENT DOCUMENTS

| JP | 05-060127 | 3/1993 |
| JP | 06-315241 | 11/1994 |
| JP | 08-210345 | 8/1996 |
| JP | 2000-120664 | 4/2000 |
| JP | 2002-061641 | 2/2002 |
| JP | 2002-195265 | 7/2002 |

* cited by examiner

Primary Examiner — William C Joyce
(74) Attorney, Agent, or Firm — J.C. Patents

(57) ABSTRACT

A hydrodynamic bearing device has favorable bearing performance and long endurance life. A thrust bearing part of the hydrodynamic bearing device has a second thrust surface. In the second thrust surface, a dynamic pressure generating groove area having a plurality of dynamic pressure generating grooves is formed in at least a part thereof in a radial direction. The action of dynamic pressure of lubricating oil increases the pressure in a thrust bearing clearance between an end of a flange part of an axial member and the second thrust surface, to support the axial member in an axial direction in a non-contact manner. The dynamic pressure generating groove area of the second thrust surface is formed by press working. The difference in height between the inner and outer peripheral edges of the surface of the dynamic pressure generating groove area regulated between or equal to 0 and 2 μm.

6 Claims, 5 Drawing Sheets

HYDRODYNAMIC BEARING DEVICE

BACKGROUND OF THE INVENTION

1. Field of the Invention

The present invention relates to a hydrodynamic bearing device. This hydrodynamic bearing device is ideal for use in motors for information technology equipment, including a spindle motor used in a magnetic disk apparatus such as HDD and FDD, an optical disk apparatus such as CD-ROM and DVD-ROM, and a magnetic optical disk apparatus such as MD and MO, and a polygon scanner motor used in a laser printer (LBP), and is also ideal for use in small motors for electrical equipment such as an axial fan.

2. Description of the Related Art

Various types of motors, as described above, are required to rotate with high accuracy, at high speed and with low noise, and to be manufactured at low cost. A bearing for supporting a spindle of the motor is one of elements which determines the required performances of the motor. To achieve the high performance of the motor, a hydrodynamic bearing device has been studied to be used, or has been used in practical applications in recent years.

Japanese Patent Laid-Open Publication No. 2002-61641 discloses one example of the hydrodynamic bearing device. The hydrodynamic bearing device comprises a cylindrical housing with a bottom, a bearing member fixed in an inner periphery of the housing, an axial member inserted into an inner peripheral surface of the bearing member, and a radial bearing part and a thrust bearing part for rotatably supporting the axial member in a non-contact manner by the action of dynamic pressure which is generated by the relative rotation between the axial member and a bearing sleeve.

In the thrust bearing part, the dynamic pressure of oil generates pressure in a clearance of the thrust bearing part, between one end face of a flange part and the bottom surface of the housing opposed to each other, and between the other end face of the flange part and the end face of the bearing sleeve opposed to each other, in order to support the axial member in a non-contact manner in an axial direction.

In the above thrust bearing part, it is necessary to form a groove for generating the dynamic pressure (a dynamic pressure generating groove) in any face opposed to the clearance of the thrust bearing part (either end face of the flange part, the bottom surface of the housing, or the end face of the bearing sleeve). Taking a case of forming the dynamic pressure generating groove in the bottom surface of the housing, for example, the dynamic pressure generating groove may be directly formed on the inner side of the bottom surface of the housing which is integrally formed in the shape of the cylinder with a bottom. Otherwise, the dynamic pressure generating groove may be formed in the end face of a thrust plate which is in the different body from the housing. In this case, the thrust plate is attached to an end opening of the housing to form the bottom surface thereof.

Using etching or electrolytic machining makes it possible to form the dynamic pressure generating groove in the end face of the thrust plate with high precision. The etching and electrolytic machining, however, cost too much. Accordingly, it is considered to form the dynamic pressure generating groove by press working. When pressing a thin body 31 such as a thrust plate with a stamping die 32, as shown in FIG. 9a, however, a molded body 31' tends to bend convexly on a stamping die side, as shown in FIG. 9b.

Thus, the flatness of a molded surface becomes worse, and the depth of the groove becomes uneven. Using the non-flat thrust plate tends to cause decrease in bearing performance due to the lack of necessary dynamic pressure, and shorten its endurance life due to the frequent occurrence of contact with the axial member.

SUMMARY OF THE INVENTION

An object of the present invention is to provide a hydrodynamic bearing device having long endurance life in which a dynamic pressure generating groove is formed in the thrust bearing part with high precision at low cost.

To achieve the above object, a hydrodynamic bearing device according to the present invention has an axial member having a first thrust surface and a second thrust surface opposed to the first thrust surface of the axial member in an axial direction, wherein a dynamic pressure generating groove area is formed in one of the first thrust surface and the second thrust surface. The dynamic pressure generating groove area has a plurality of dynamic pressure generating grooves. A dynamic pressure action of a fluid generates pressure in a thrust bearing clearance between the first thrust surface and the second thrust surface to support the axial member in an axial direction in a non-contact manner. In this configuration, the dynamic pressure generating groove area is formed by press working, and a difference in height obtained by subtracting a height of an outer peripheral edge of a surface of the dynamic groove area from that of an inner peripheral edge thereof is between or equal to 0 and +2 μm.

According to the present invention, since the dynamic pressure generating groove area facing to the thrust bearing clearance is formed by press working, it is possible to mold a dynamic pressure generating groove at low cost. The difference in height of the inner and outer radial parts of the dynamic pressure generating groove area is regulated as above, so that the inner radial part having low peripheral speed makes contact with the axial member upon actuating and stopping a motor and the like. Therefore, the contact parts of the axial member and the dynamic pressure generating groove area are prevented from wearing out, so that it is possible to increase the endurance life of the bearing device. To form the difference in height of the dynamic pressure generating groove area, a material to be pressed has such a structure that a part thereof corresponding to the dynamic pressure generating groove area tapers down to an inner radial side.

The first and second thrust surfaces are formed in the direction orthogonal to the axial direction. In a case that the axial member is provided with a flange part, the first thrust surface may be formed in an end face of the flange part facing to the second thrust surface. The first thrust surface may be formed in an end surface of a bar-shaped axial member.

The rough surface of the dynamic pressure generating groove area P makes it difficult to satisfy the above requirement for the difference in height, even if the dynamic pressure generating groove area is molded by press working with high precision. If the surface roughness of the dynamic pressure generating groove area is less than or equal to 0.6 Ra, however, it is possible to satisfy the requirement. "Ra" refers to center line average roughness defined by Japanese Industrial Standards (JIS B0601).

At least a ridge of the dynamic pressure generating groove area is subjected to finish processing, to achieve the surface roughness of 0.6 Ra or less. The "ridge" of the dynamic pressure generating groove area refers to a convex part between the dynamic pressure generating grooves adjacent to each other. It is preferable to adopt a processing method for removing microscopic convex parts, such as lapping, chemical polishing and the like, as the finish processing. In addition, the dynamic pressure generating groove area may be re-pressed after the first press (pressed twice) as the finish processing, to obtain similar surface roughness.

The hydrodynamic bearing device may further comprise a housing, one end of which has an opening, and the other end of which is sealed with a thrust plate. In this case, the dynamic pressure generating groove area may be formed in the end face of the thrust plate. If the axial member is provided with a flange part, the dynamic pressure generating groove area may be formed in the first thrust surface of the flange part.

DETAILED DESCRIPTION OF THE PREFERRED EMBODIMENTS

An embodiment of the present invention will be hereinafter described.

Figure 1:
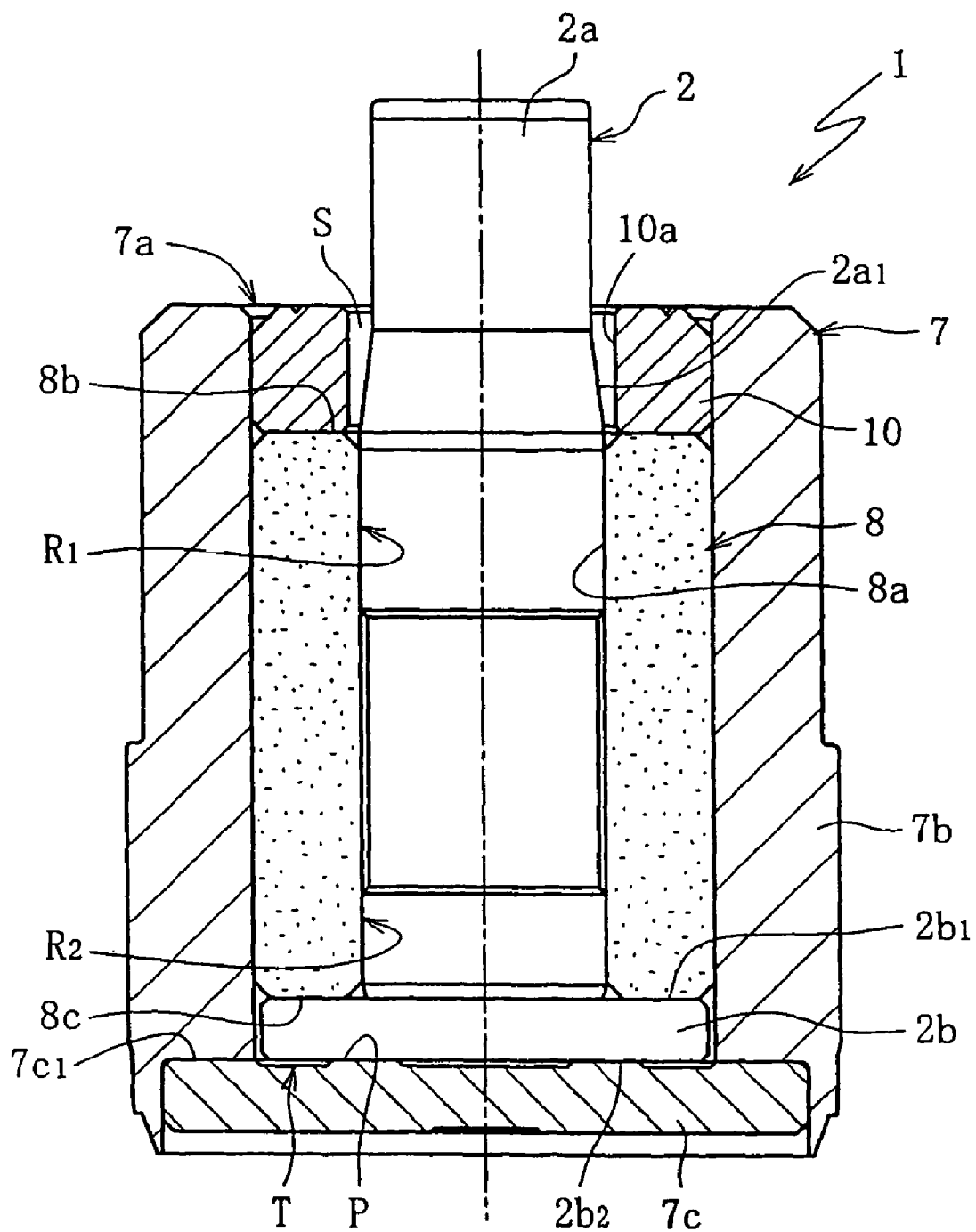
FIG. 1 is a cross-sectional view showing a hydrodynamic bearing device according to an embodiment of the present invention.

FIG. 1 shows a hydrodynamic bearing device 1 according to the present invention. The dynamic bearing device 1 comprises a cylinder-shaped housing 7 with a bottom having an opening 7a at one end thereof, a cylinder-shaped bearing sleeve 8 fixed in the inner peripheral surface of the housing 7, an axial member 2, and a seal member 10 secured to the opening 7a of the housing 7. For the sake of convenience, the side of a thrust bearing part T refers to a lower side, and the side opposite to the thrust bearing part T refers to an upper side in the following description.

The housing 7 formed in the shape of a cylinder with the bottom has a side part 7b and a bottom part 7c. In this embodiment, the bottom part 7c is made of a thin disk-shaped thrust plate, substantially having uniform thickness, which is a different element from the side part 7b. The thrust plate 7c is bonded, press-fitted, or concurrently bonded and press-fitted to the lower side opening of the side part 7b, to form the housing 7 one end of which is sealed.

Figure 2:
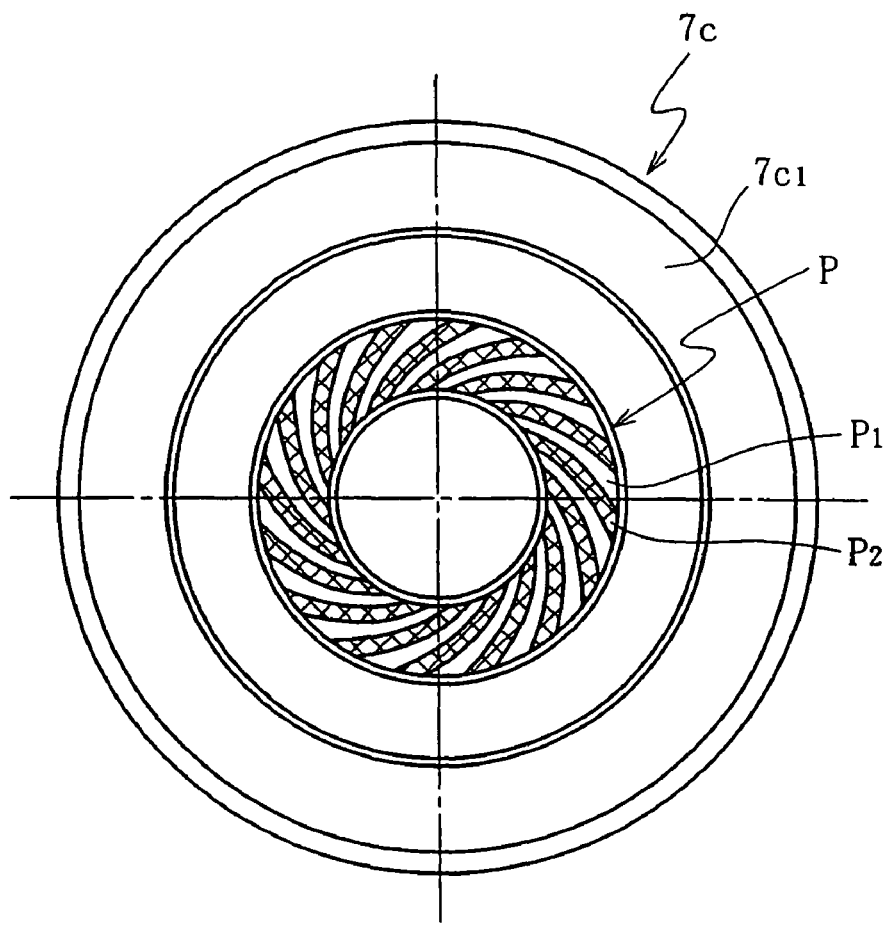
FIG. 2 is a plan view showing a second thrust surface (an upper end face of a thrust plate)

A ring-shaped area P, as one of thrust bearing surfaces of the thrust bearing part T, (a dynamic pressure generating groove area) is formed in the upper surface 7c1 of the thrust plate 7c (second thrust surface). In this area P, as shown in FIG. 2, a plurality of dynamic pressure generating grooves P1, and ridges P2 as convex parts between the dynamic pressure generating grooves P1 are formed in a spiral shape. The dynamic pressure generating groove area P is formed by press working, as described later. To improve the processibility of the dynamic pressure generating groove area P, it is preferable that the thrust plate 7c is made of soft metal with low yield stress, such as copper alloy (brass, gun metal, lead bronze, phosphor bronze or the like) or aluminum alloy (A2 to 7 types defined by JIS). The dynamic pressure generating groove can be formed in any shape, for example, in the shape of a herringbone. The ring-shaped dynamic pressure generating groove area P is generally formed in a part of the upper surface 7c1 in a radial direction. The dynamic pressure generating groove area P may be formed in a different part from FIG. 2 (for example, on an inner radial side than FIG. 2).

The axial member 2, made of metal such as stainless steel (e.g. SUS420J2 defined by JIS) or the like, has an axial part 2a, and a flange part 2b which is provided integrally with the lower end of the axial part 2a or separately provided from the axial part 2a. The upper end face 2b1 of the flange part 2b is opposed to the lower end face 8c of the bearing sleeve 8 via a thrust bearing clearance. The lower end face 2b2 (first thrust surface) of the flange part 2b is opposed to the upper end face 7c1 (second thrust surface) of the thrust plate 7c via the thrust bearing clearance.

The cylindrical bearing sleeve 8 is made of porous material, for example, oil-impregnated sintered metal in which lubricating oil or lubricating grease is impregnated with sintered metal mainly consisting of copper. In the inner peripheral surface 8a of the bearing sleeve 8, first and second radial bearing surfaces of first and second radial bearing parts R1 and R2 are provided separately in an axial direction. Dynamic pressure generating grooves, for example, formed in a herringbone pattern are formed in each of the first and second radial bearing surfaces. The shape of the dynamic pressure generating groove may be a spiral, a slot extending to the axial direction, or the like. The dynamic pressure generating groove may be formed in the outer peripheral surface of the axial part 2a of the axial member 2 which is opposed to the inner peripheral surface 8a of the bearing sleeve 8 via a radial bearing clearance. The bearing sleeve 8 may be made of soft metal such as brass, copper alloy and the like, instead of the porous material.

In the lower end face 8c of the bearing sleeve 8, the other thrust bearing surface of the thrust bearing part T (dynamic pressure generating groove area) is formed in a ring shape. A spiral-shaped dynamic pressure generating groove (not-illustrated) is formed in the dynamic pressure generating groove area. The dynamic pressure generating groove can be formed in any shape, for example, in the shape of a herringbone pattern.

The ring-shaped seal member 10, as shown in FIG. 1, is secured to the inner peripheral surface of the opening 7a of the housing 7 by press-fitting, bonding or the like. In this embodiment, the inner peripheral surface 10a of the seal member 10 is formed in a cylindrical shape. The lower end face of the seal member 10 is in contact with the upper end face 8b of the bearing sleeve 8.

The axial part 2a of the axial member 2 is inserted into the inner peripheral surface 8a of the bearing sleeve 8. The flange part 2b is contained in the space between the lower end face 8c of the bearing sleeve 8 and the upper end face 7c1 of the thrust plate 7c. Since a tapered surface 2a1 of the axial part 2a is opposed to the inner peripheral surface 10a of the seal member 10 via a predetermined gap, a tapered sealed space S which gradually enlarges toward the outside of the housing 7 (upward in FIG. 1) is formed between them. When the axial member 2 rotates, the tapered surface 2a1 of the axial part 2a functions as the so-called centrifugal seal. The inside of the housing 7 (including pores inside the bearing sleeve 8) tightly sealed with the seal member 10 is filled with lubricant (lubricating oil), and the oil level of the lubricant is in the sealed space S. The sealed space S may be in the shape of a cylinder having an equal radius in the axial direction, instead of being tapered.

When the axial member 2 rotates relatively to the housing 7 (when the axial member 2 rotates in this embodiment), the action of dynamic pressure of the lubricating oil increases the pressure of the radial bearing clearance. Oil films formed in the upper and lower parts of the radial bearing clearance support the axial part 2a of the axial member 2 rotatably in a radial direction in a non-contact manner. Thus, the first and second radial bearing parts R1 and R2 support the axial member 2 rotatably in the radial direction in a non-contact manner. At the same time, since the action of dynamic pressure of the lubricating oil increases the pressure of two of upper and lower thrust bearing clearances, oil films formed in the thrust bearing clearances support the flange part 2b of the axial member 2 rotatably in either axial direction in a non-contact manner. Thus, the thrust bearing part T supports the axial member 2 rotatably in the axial direction in a non-contact manner.

The dynamic pressure generating groove area P is formed in the upper end face 7c1 of the thrust plate 7c by plastic deformation caused by press working, in other words, by pressing material 7c' of the thrust plate 7c disposed on the die 25 with upper and lower punches 21 and 23. One of the punches 21 and 23, for instance, the upper punch 21 is provided with a die 23 in the shape of a groove corresponding to the dynamic pressure generating groove area P. Pressing the die 23 against the material 7c' with confining the outside diameter of the material 7c' within the inner periphery of the die 25, the dynamic pressure generating groove area P is transferred to the end face of the material 7c' by plastic deformation.

According to the present invention, as described above, the thrust plate 7c is made of the soft material 7c' with low yield stress, so that the dynamic pressure generating groove is formed with high precision even if the pressure of press working is low.

Figure 3:
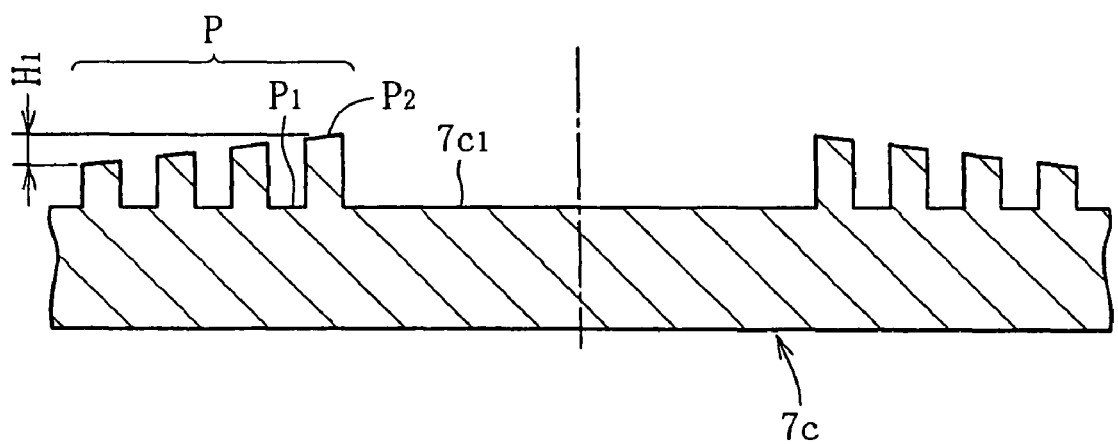
FIG. 3 is an enlarged cross-sectional view of the second thrust surface (the upper end face of the thrust plate) according to the present invention.

The dynamic pressure generating groove area P of the thrust plate 7c, as shown in FIG. 3, has such a structure that difference in height between the inner and outer edges of the surface thereof, namely the subtraction of the height of the outer edge from that of the inner edge, is between or equal to 0 and +2 μm. When the difference in height is 0, the surface of the dynamic pressure generating groove area P is a flat plane orthogonal to the axial direction. When the difference in height exceeds 0, the surface of the dynamic pressure generating groove area P is inclined to an outer radial side. The surface is linearly inclined in FIG. 3, but may be inclined in a curve. Incidentally, in FIG. 3, the inclination of the surface of the dynamic pressure generating groove area P is exaggerated for the purpose of easy understanding.

Since the surface of the dynamic pressure generating groove area P is flat or inclined to the outer radial side thereof, as described above, the whole surface or the inner peripheral part of the dynamic pressure generating groove area P makes contact with the lower end face 2b1 of the flange part 2b, just after actuating or just before stopping the motor. Accordingly, the dynamic pressure generating groove area P does not make contact only by the outer peripheral part thereof having high peripheral speed, so that it is possible to prevent the flange part 2b and the thrust plate 7c from lopsidedly wearing out due to the contact just after actuating or just before stopping the motor. Therefore, the life of bearing is improved.

When the difference in height is a negative value less than 0 mm, the surface of the dynamic pressure generating groove area P is inclined to an inner radial side thereof. Thus, as described above, there is a problem that the dynamic pressure generating groove area P makes contact with the flange part 2b by the outer peripheral part having the high peripheral speed. When the difference in height exceeds 2 μm, there is a problem that the wearing out of a contact part is contrarily accelerated.

Figure 4:
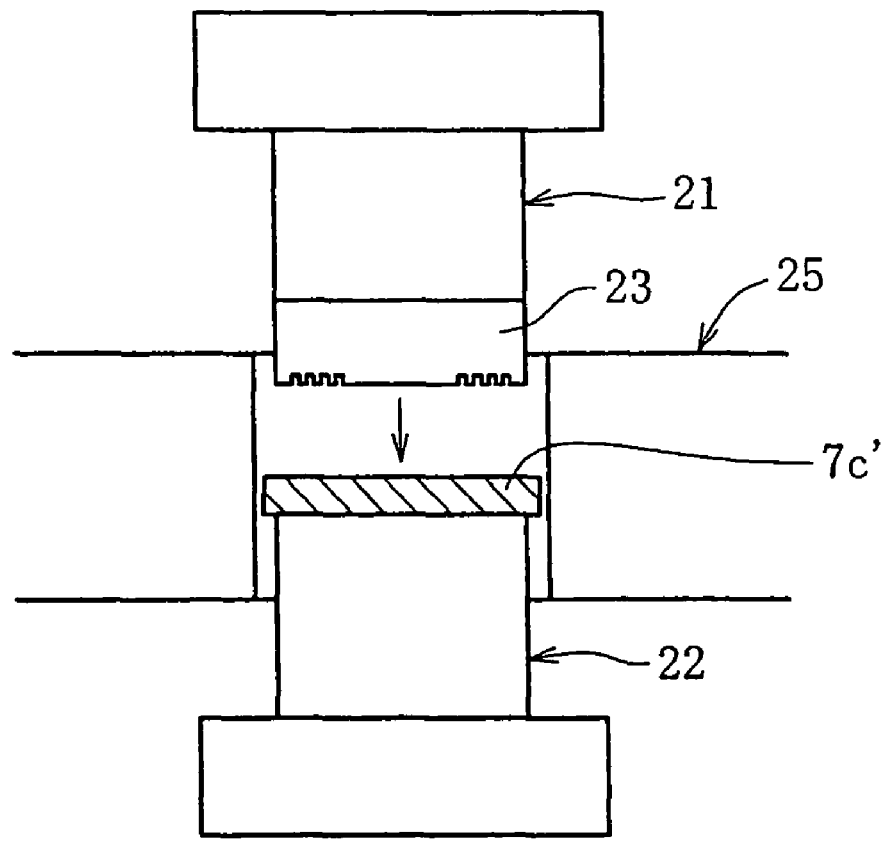
FIG. 4 is a cross-sectional view showing the schematic structure of press equipment for molding the second thrust surface.
Figure 5:
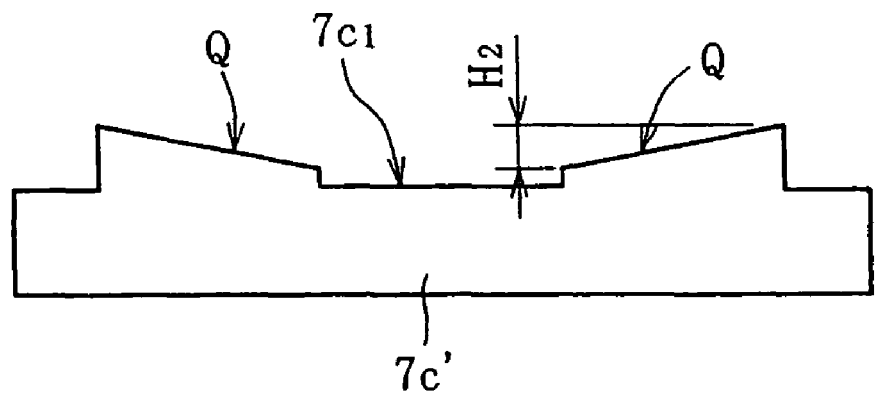
FIG. 5 is a cross-sectional view showing the shape of material of the thrust plate before pressing.
Figure 9A:
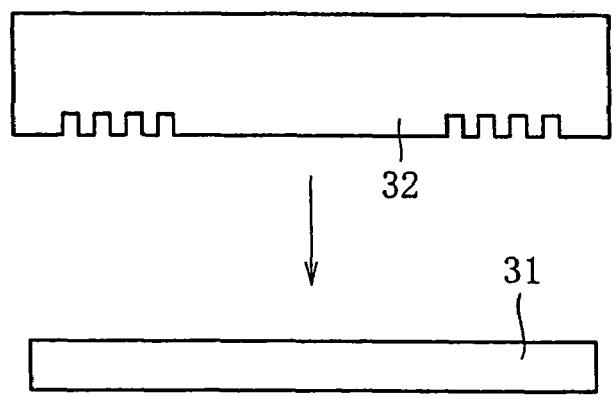
FIGS. 9a and 9b are cross-sectional views showing a thin material before and after press working, respectively.
Figure 9B:

Referring to FIG. 5, the thrust plate 7c is made of the material 7c', in which an area Q corresponding to the dynamic pressure generating groove area P tapes down so that the height on the inner radial side is lower than that on the outer radial side by H2. Pressing the material 7c' by press equipment shown in FIG. 4, the thrust plate 7c is molded. A press makes the material 7c' warped, as shown in FIGS. 9a and 9b. Since deformation due to the press, however, cancels the taper of the area Q, it is possible to mold the thrust plate 7c in such a structure that the difference in height of the dynamic pressure generating groove area P after the press becomes within a predetermined range ($0 \leq H1 \leq 2$ μm).

When the surface of the dynamic pressure generating groove area P of the thrust plate 7c is rough, it becomes difficult to satisfy the formula of $H1 \leq 2$ μm, even if the press shown in FIG. 4 molds the thrust plate 7c with high precision. Thus, it is preferable to make the surface roughness of the dynamic pressure generating groove area P smooth as much as possible. In view of the above, it is preferable that the surface roughness of the dynamic pressure generating groove area P (especially, the surface roughness of the ridges P2) is within the range of 0 to 0.6 Ra. After the press, the ridges P2 of the dynamic pressure generating groove area P (or both the dynamic pressure generating grooves P1 and the ridges P2) are subjected to finish processing to achieve the target surface roughness. In consideration of processing costs, it is preferable to adopt lapping, chemical polishing, re-pressing (pressing twice) or the like as the finish processing.

Figure 6:
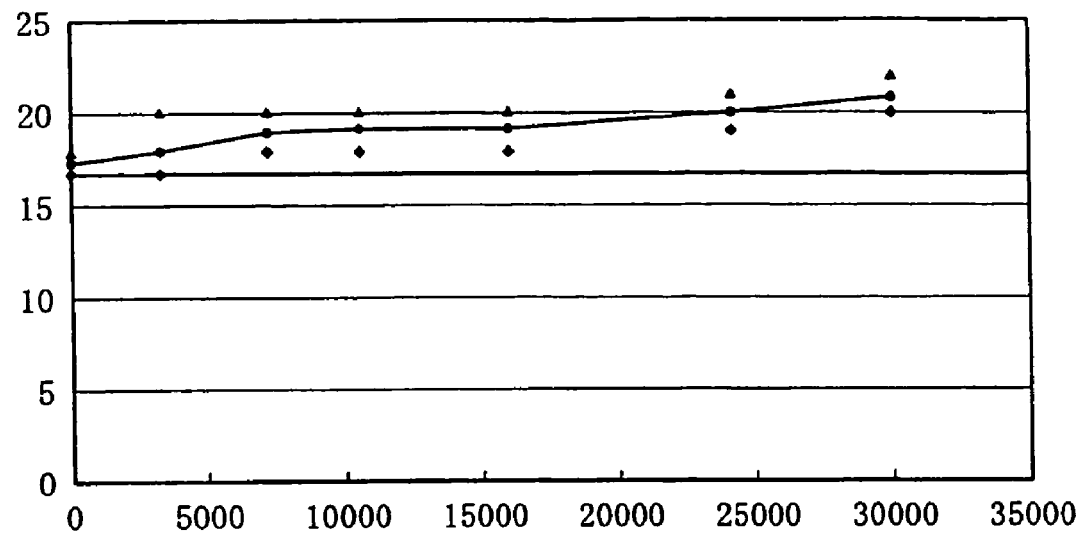
FIG. 6 is a graph showing the measurement results of relative variation of a thrust bearing clearance in an ordinary hydrodynamic bearing device.
Figure 7:
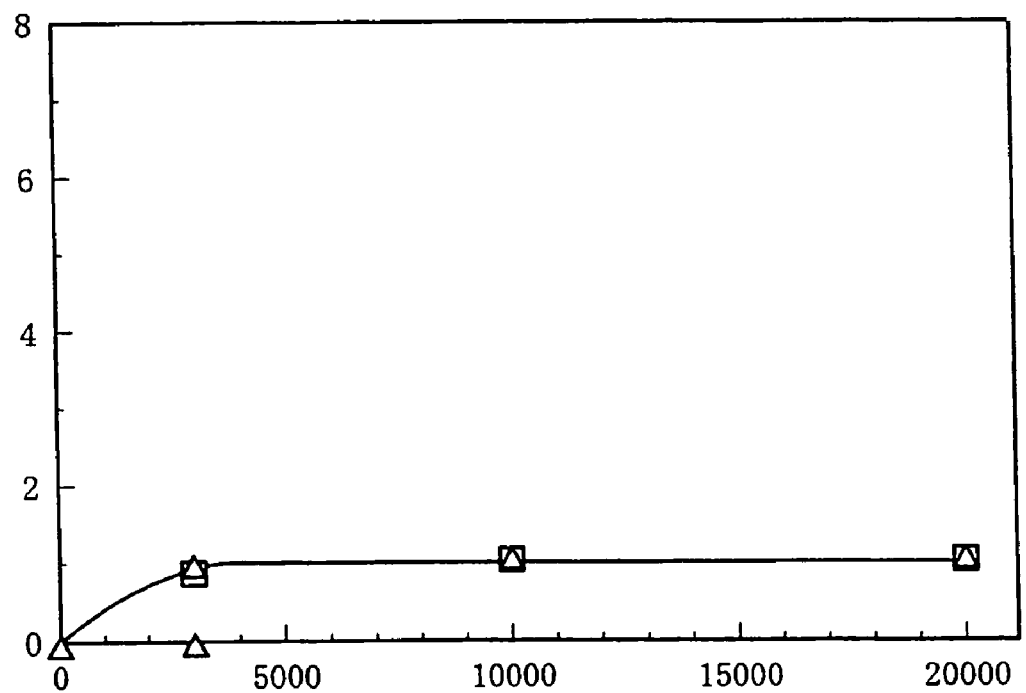
FIG. 7 is a graph showing the measurement results of relative variation of a thrust bearing clearance in the hydrodynamic bearing device according to the present invention.

FIGS. 6 and 7 show graphs of relative variation in the thrust bearing clearance, wherein the bearing device according to the present invention with the thrust plate 7c taking above measures, and an ordinary bearing device with the pressed thrust plate without taking the above measures are repeatedly actuated and stopped, respectively. In FIGS. 6 and 7, a horizontal axis represents the number of tests (cycle) and a vertical axis represents an amount of wearing out (μm). As is clear from FIGS. 6 and 7, the amount of wearing out significantly decreases in the bearing device according to the present invention as compared with the ordinary bearing device, so that the endurance life of the bearing device is improved outstandingly.

In the above embodiment, the dynamic pressure generating groove area P is formed in the thrust plate 7c which is not integral with the housing 7. The present invention, however, is also applicable to the thrust plate integral with the housing. In other words, the housing 7 may be formed in the shape of a cylinder with a bottom, and the dynamic pressure generating groove area P may be formed in the inner surface of a bottom surface by press working.

Figure 8:
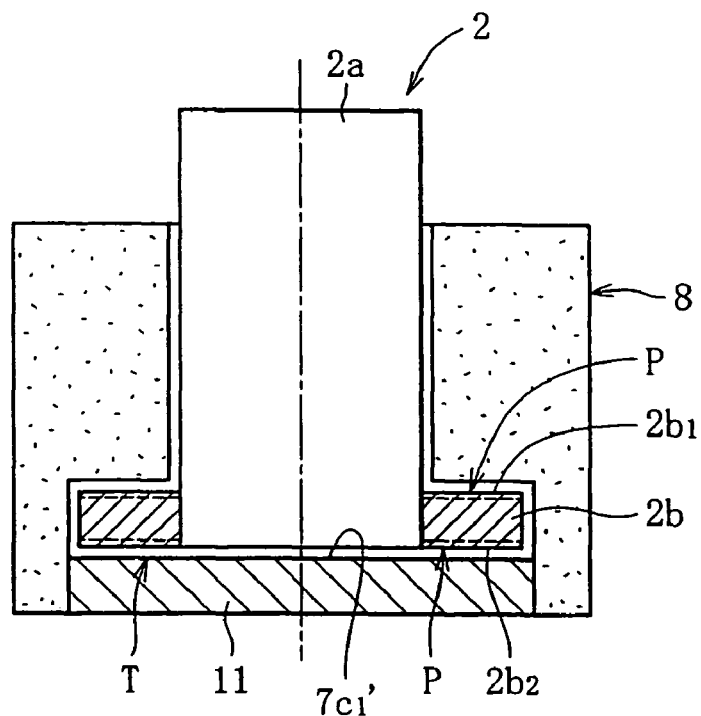
FIG. 8 is a cross-sectional view showing another embodiment of the present invention.

Referring to FIG. 8, the dynamic pressure generating groove area P may be formed in one or both of the end faces 2b1 and 2b2 of the flange part 2b, by pressing the material of the flange part 2b in the same manner as above. (The dynamic pressure generating groove areas P are formed in both end faces in FIG. 8.) This structure is especially suitable for a case that the axial part 2a and the flange part 2b of the axial member 2 have different bodies from each other.

In the embodiment shown in FIG. 8, a thrust member 11 seals one end opening of the bearing sleeve 8, and the upper end face of the thrust member 11 functions as a second thrust surface 7c1' which is opposed to the lower end face 2b2 of the flange part 2b. As with the embodiment shown in FIG. 1, however, the second thrust surface 7c1 may be formed in the upper end face of the thrust plate 7c which constitutes the bottom surface of the housing 7.

In the above embodiments, the hydrodynamic pressure bearings having the dynamic pressure generating grooves are used as the radial bearing parts R1 and R2. Different bearings, however, are available as the radial bearing parts R1 and R2, as long as oil films of lubricating oil formed in the radial bearing clearances support the axial member 2 in a radial direction in a non-contact manner. A radial bearing surface, for example, may be in the shape of a perfect circle in cross section without a dynamic pressure generating groove (perfect circular bearing).

According to the present invention, it is possible to mold the dynamic pressure generating groove area of the thrust bearing part with high precision by press working. Therefore, it is possible to provide the hydrodynamic bearing device at low cost which has favorable bearing performance and long endurance life.

What is claimed is:

1. A hydrodynamic bearing device comprising:
   an axial member having a first thrust surface; and
   a second thrust surface opposed to the first thrust surface of the axial member in an axial direction, a dynamic pressure generating groove area being formed in one of the first thrust surface and the second thrust surface, the dynamic pressure generating groove area having a plurality of dynamic pressure generating grooves and ridges, an action of dynamic pressure of a fluid generating a pressure in a thrust bearing clearance between the first thrust surface and the second thrust surface to support the axial member in the axial direction in a non-contact manner,
   wherein the dynamic pressure generating groove area is formed by press working, and a difference in height (H1) obtained by subtracting a height of an outer peripheral edge of a surface of the dynamic groove area from that of an inner peripheral edge thereof is set to within a range of $0 < H1 \leq +2$ μm,
   wherein in the one of the first thrust surface and the second thrust surface having the dynamic pressure generating groove area, an inner surface surrounded by the inner peripheral edge of the dynamic pressure generating groove area is lower in height than an innermost one of the ridges,
   wherein each of the ridges has a slop top surface for gradually descending required by the difference in height (H1).

2. The hydrodynamic bearing device according to claim 1, wherein the axial member is provided with a flange part, and the first thrust surface is provided in an end face of the flange part opposed to the second thrust surface.

3. The hydrodynamic bearing device according to claim 2, wherein the dynamic pressure generating groove area is formed in the first thrust surface of the flange part.

4. The hydrodynamic bearing device according to claim 1, wherein a surface roughness of the dynamic pressure generating groove area is less than, or equal to, 0.6 Ra.

5. The hydrodynamic bearing device according to claim 4, wherein at least a ridge of the dynamic pressure generating groove area is subjected to finish processing.

6. The hydrodynamic bearing device according to claim 1, further comprising a housing, one end of which is provided with an opening, and the other end of which is sealed with a thrust plate,
   wherein the dynamic pressure generating groove area is formed in an end face of the thrust plate.

* * * * *